United States Patent [19]

Söderberg

[11] Patent Number: 4,653,795
[45] Date of Patent: Mar. 31, 1987

[54] PASSENGER MOTOR VEHICLE REAR SECTION

[75] Inventor: Richard Söderberg, Muehlacker, Fed. Rep. of Germany

[73] Assignee: Dr. Ing. H.c.F. Porsche Aktiengesellschaft, Fed. Rep. of Germany

[21] Appl. No.: 878,511

[22] Filed: Jun. 23, 1986

Related U.S. Application Data

[63] Continuation of Ser. No. 646,249, Aug. 31, 1984, abandoned.

[30] Foreign Application Priority Data

Sep. 1, 1983 [DE] Fed. Rep. of Germany ....... 3331583

[51] Int. Cl.[4] .................. B62D 35/02; B62D 25/16
[52] U.S. Cl. .................... 296/1 S; 296/195; 280/153 B; 293/113
[58] Field of Search .............. 296/1 S, 191, 193, 195; 293/113; 280/770, 152 R, 152.3, 153 R, 153 B, 154

[56] References Cited

U.S. PATENT DOCUMENTS

| | | | |
|---|---|---|---|
| 3,596,975 | 8/1971 | Stephen | 296/1 S |
| 4,284,302 | 8/1981 | Drews | 296/1 S |
| 4,379,582 | 4/1983 | Miwa | 296/1 S |
| 4,402,537 | 9/1983 | Gallitzendorfer et al. | 296/191 |
| 4,511,170 | 4/1985 | Sankrithi | 296/1 S |

FOREIGN PATENT DOCUMENTS

| | | | |
|---|---|---|---|
| 2340308 | 2/1975 | Fed. Rep. of Germany | 296/1 S |
| 2433292 | 1/1976 | Fed. Rep. of Germany | 296/1 S |
| 2555006 | 6/1977 | Fed. Rep. of Germany | 296/1 S |
| 3030412 | 3/1982 | Fed. Rep. of Germany | 296/1 S |
| 945869 | 5/1949 | France | 296/1 S |
| 975220 | 11/1964 | United Kingdom | 296/195 |

OTHER PUBLICATIONS

J. C. Whitney, Catalog No. 422D, copyright 1982, pp. 133 and 134.

Primary Examiner—Robert B. Reeves
Assistant Examiner—Dennis H. Pedder
Attorney, Agent, or Firm—Barnes & Thornburg

[57] ABSTRACT

A passenger motor vehicle rear section includes body parts extending adjacent the road surface and an apron which is so constructed that it performs a protective function for traffic participants who follow the vehicle as well as covering body parts and/or aggregates of the passenger motor vehicle and additionally is aerodynamically designed; the apron has the shape of a plate which extends in the vehicle longitudinal direction, is arranged at a distance to the body parts and is secured at the latter.

5 Claims, 5 Drawing Figures

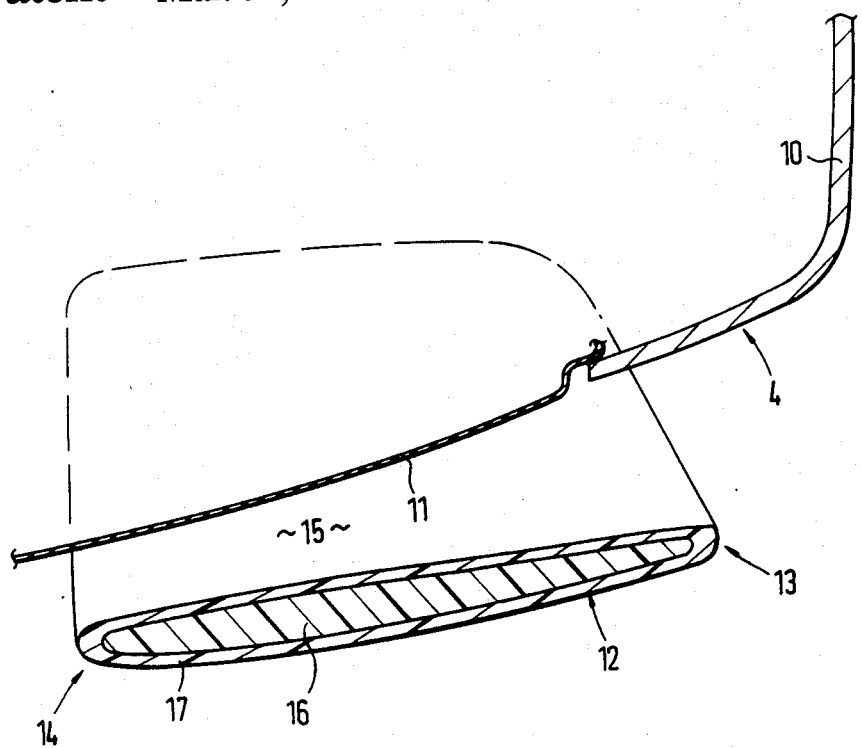
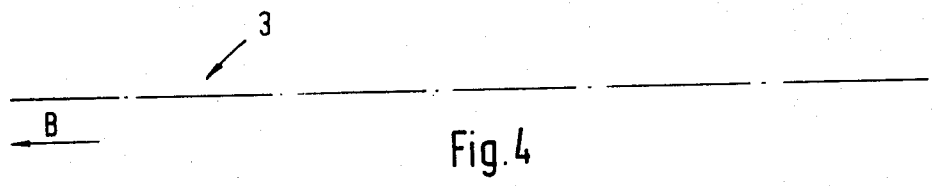
Fig. 4
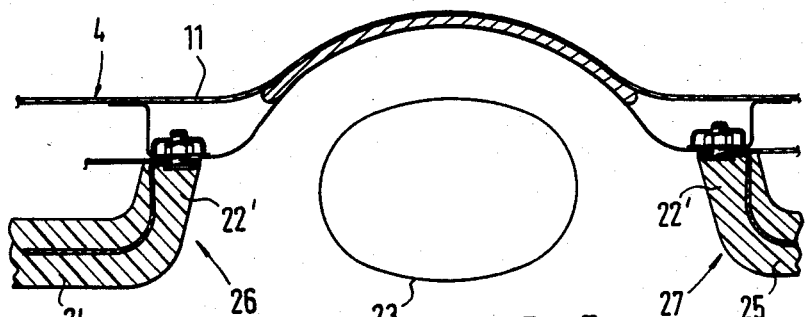
Fig. 5

PASSENGER MOTOR VEHICLE REAR SECTION

This is a continuation of application Ser. No. 646,249 filed Aug. 31, 1984, abandoned.

BACKGROUND OF THE INVENTION

The present invention relates to a passenger motor vehicle rear section with body parts extending adjacent to the road and with an apron.

In a prior art passenger motor vehicle rear section (German Gebrauchsmuster No. 8 207 282) the apron is connected directly to the bottom side of the bumper and of the fender sections, whereby the vertically extending walls of the apron are adapted to the configuration of the bumper and of the fender sections. This apron is characterized by the fact that it holds back the stones and dirt particles thrown up by the wheels so that following traffic participants are less endangered. However, this prior art apron entails the disadvantage that the body parts and/or aggregates (for example fuel tank) of the passenger motor vehicle which extend adjacent the road surface, can be damaged by thrown-up stones. Additionally, the transversely extending section of the apron causes turbulences increasing the air resistance or drag coefficient notwithstanding the through-flow openings.

SUMMARY OF THE INVENTION

It is therefore the task of the present invention to so construct an apron in a passenger motor vehicle rear section that it exercises a protective function for following traffic participants, covers body parts and/or aggregates of the passenger motor vehicle and is constructed favorably from an aerodynamic point of view.

The underlying problems are solved according to the present invention in that the apron has the form of a plate which extends in the vehicle longitudinal direction, is arranged at a distance to the body parts and is secured at the same.

The principle advantages achieved with the present invention reside in that by the arrangement and construction of the apron (by means of which also an aesthetic effect is achieved), on the one hand, following traffic participants are protected and, on the other, the body parts and/or aggregates of the passenger motor vehicle disposed behind the apron are covered. Owing to the aerodynamic configuration of the apron the air resistance or drag coefficient is improved. Additionally, the apron consisting of plastic material can be easily manufactured and can also be secured subsequently at the vehicle.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 4 is a cross sectional view, on an enlarged scale, taken along line IV—IV of FIG. 2; and FIG. 5 is a cross sectional view, on an enlarged scale, of the detail indicated by the dash and dot circle X of FIG. 2.

DETAILED DESCRIPTION OF THE INVENTION

Figure 1:
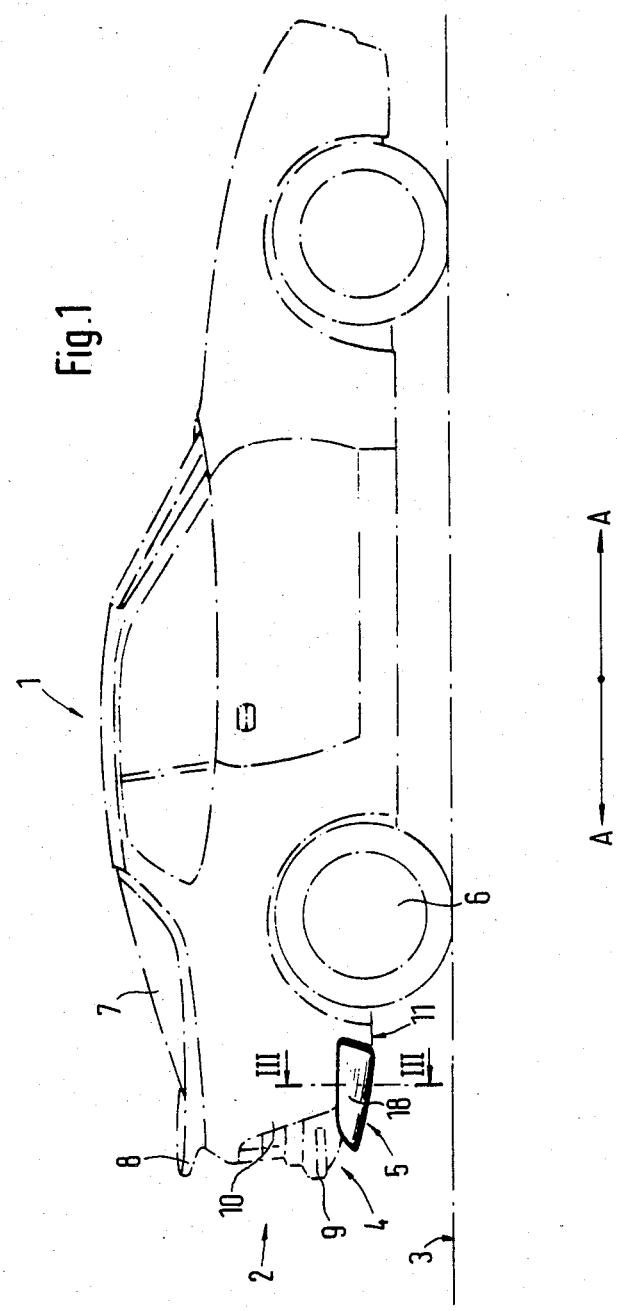
FIG. 1 is a side elevational view of a passenger motor vehicle with an apron in accordance with the present invention.

Referring now to the drawings wherein like reference numerals are used throughout the various views to designate like parts, the passenger motor vehicle generally designated by reference numeral 1 includes in the rear section 2 thereof body parts 4, an apron 5 (which extend adjacent the road surface 3), rear wheels 6 and a rear window 7. The rear window 7 is provided with an air guide device (spoiler) 8. The body parts 4 are composed according to FIG. 1 of a bumper 9, of fenders 10 and of a vehicle bottom 11.

The apron 5 extending over the width of the passenger motor vehicle 1 has—as viewed in longitudinal cross section—the form of a plate 12 (FIG. 4) which is arranged at a distance to the adjoining body parts 4 and is secured at the latter. The plate 12 extending in the vehicle longitudinal direction A—A (an essentially horizontal arrangement) has an aerodynamically formed configuration (wing-like aerodynamic body) and is so inclined to the road surface 3 that the rear end 13, as viewed in the driving direction B, is further away from the road surface 3 than the forward end 14 (FIG. 4).

The gap 15 (FIG. 4) resulting between the plate 12 and the body parts 4 disposed thereabove, for the conduction of the air flow occurring during the driving operation, has a cross sectional configuration that continuously increases—as viewed in a direction opposite the driving direction B.

The apron 5 made of plastic material includes an inner hard foam core 16 that is surrounded by a soft foam material layer 17. The foamed material layer 17 is made, for example, of polyurethane foamed material.

Figure 2:
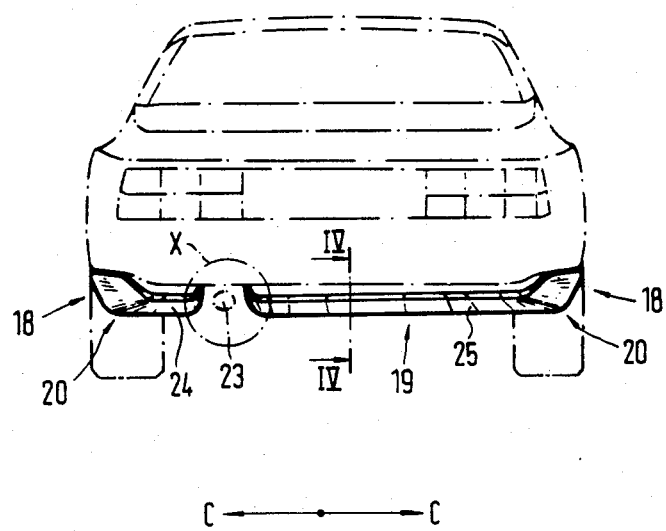
FIG. 2 is a rear elevational view of the passenger motor vehicle of FIG. 1.

According to FIG. 2, the apron 5 extends transversely to the vehicle longitudinal direction A—A and is provided within the area of the fenders 10 with drawn-up sections 18 so that the fenders 10 and the bumper 9 are covered sectionwise. A rounded-off transistion area 20 is provided between the transversely extending section 19 and the drawn-up sections 18 of the apron 5.

Figure 3:
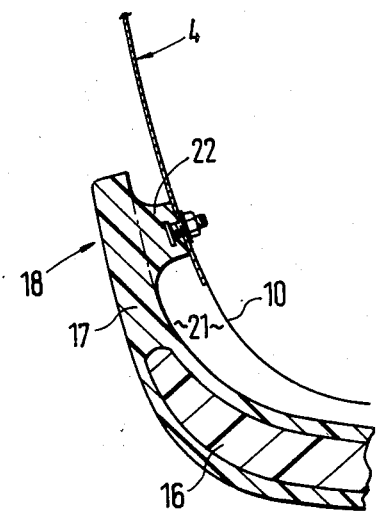
FIG. 3 is a cross sectional view, on an enlarged scale, taken along line III—III of FIG. 1.

The apron 5 extends in the drawn up section 19 essentially at a distance to the body parts 4—gap 21 (FIG. 3)—, while support sections 22 are provided only at the existing fastening points which support sections 22 are extending up to the body parts 4 and for the fastening of the apron 5 are equipped with screws, threaded bolts or the like.

According to FIG. 2 and FIG. 5, the apron 5 consists—as viewed in the vehicle transverse direction C—C —of two parts 24 and 25 for the passage of an exhaust gas line 23, whereby the ends 26 and 27 of the two parts 24 and 25 which extend adjacent the exhaust gas line 23, are constructed as support sections 22'.

However, also a one-piece apron 5 is feasible within the scope of the present invention which partially surrounds the exhaust gas line 23 within the area of the latter.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A passenger motor vehicle rear section comprising rear wheels, rear fender means, body parts extending adjacent a road surface and an apron means, said apron means extending both transversely to and rearwardly along the vehicle longitudinal direction from a point on the vehicle closely adjacent to the rear wheels of the vehicle to provide for abrasion protection for the rear section of the vehicle and having an aerodynamic configuration, as viewed in longitudinal cross section, said apron means extending below said vehicle and being separated from and defining a gap with said body parts, said apron means having upwardly extending terminal support sections which are extended up to the body parts for fastening said apron means to the vehicle in the area of said rear fender means, and wherein the apron means consists, as viewed in the vehicle transverse direction, of two parts for the passage of an exhaust gas line therebetween with ends of said two parts extending adjacent the exhaust gas line being constructed as further support sections connected to said body parts.

2. A passenger motor vehicle rear section according to claim 1, wherein said apron means essentially consists of plastic material.

3. A passenger motor vehicle rear section according to claim 1, wherein said apron means includes a hard foam core which is surrounded by a soft foam material layer.

4. A passenger motor vehicle according to claim 1, wherein said upwardly extending support sections are provided with threaded means for fastening said apron means.

5. A passenger motor vehicle rear section according to claim 1, wherein said gap enlarges in vertical height along the longitudinal vehicle direction.

* * * * *